Oct. 2, 1934.　　　　M. BERKOWITZ　　　　1,975,309
MOTION PICTURE PROJECTING MACHINE
Filed Aug. 5, 1930　　　2 Sheets-Sheet 1
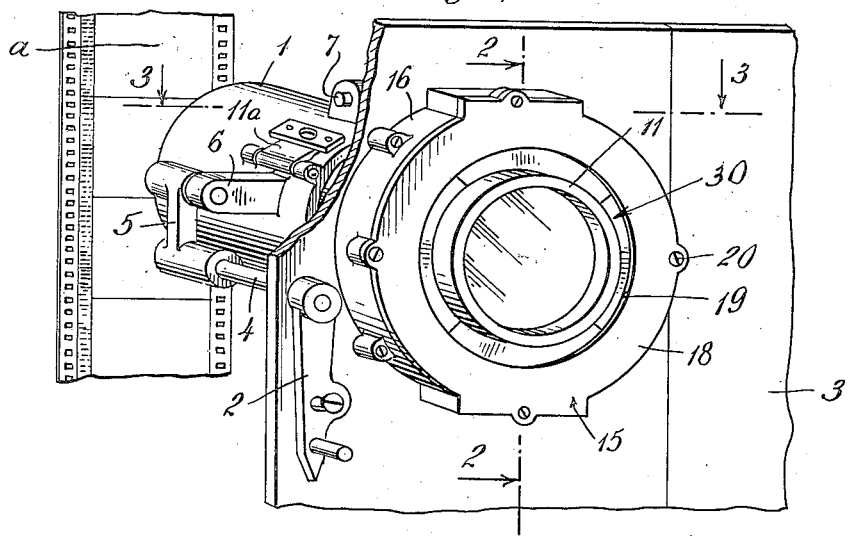
INVENTOR
MICHAEL BERKOWITZ
BY
Pennie, Davis, Marvin & Edmonds
ATTORNEYS Oct. 2, 1934.　　　　M. BERKOWITZ　　　　1,975,309
MOTION PICTURE PROJECTING MACHINE
Filed Aug. 5, 1930　　　2 Sheets-Sheet 2
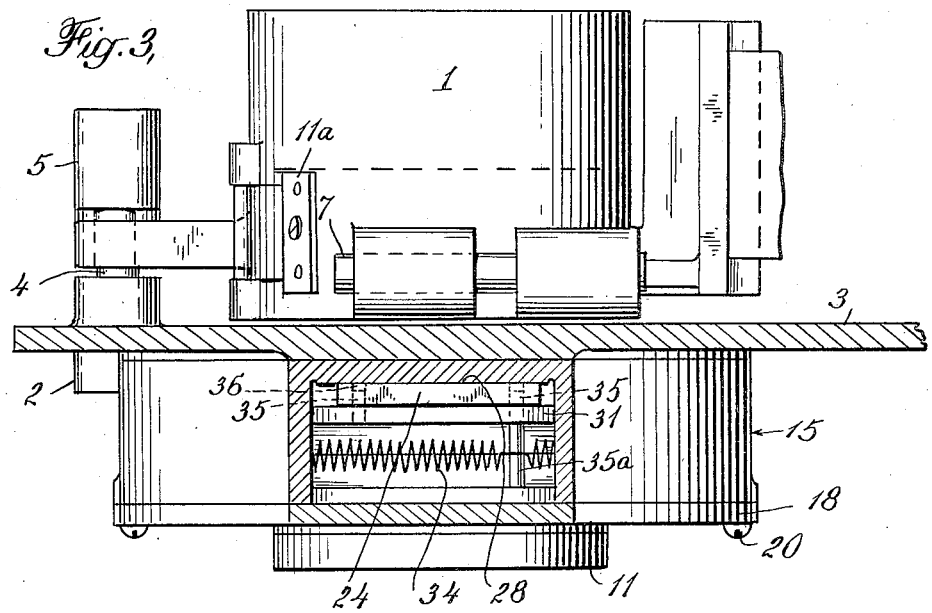
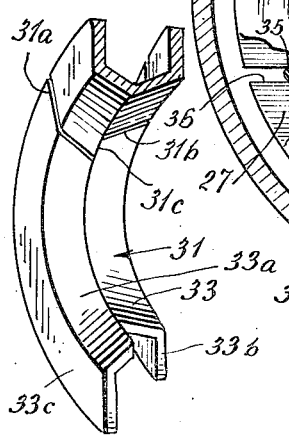
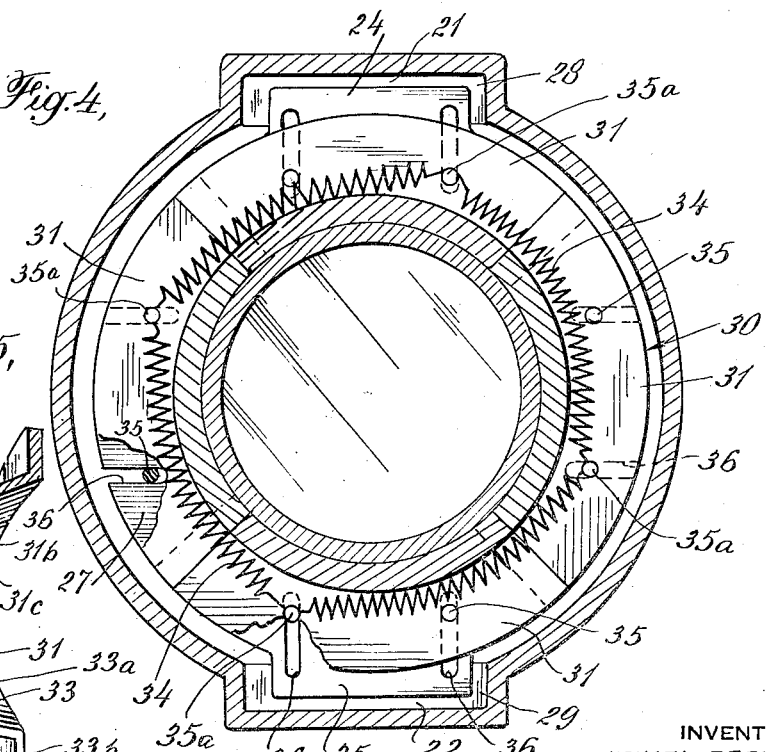
INVENTOR
MICHAEL BERKOWITZ
BY
ATTORNEYS Patented Oct. 2, 1934

1,975,309

UNITED STATES PATENT OFFICE 1,975,309

MOTION PICTURE PROJECTING MACHINE

Michael Berkowitz, New York, N. Y., assignor to United Research Corporation, Long Island City, N. Y., a corporation of Delaware Application August 5, 1930, Serial No. 473,175

11 Claims. (Cl. 88—24)

This invention relates to improvements in motion picture projecting machines and has for its object to provide means permitting of quickly changing from one objective or focusing lens to another.

One feature of the present invention is the provision of a projecting lens tube having a stop collar capable of adjustment at different distances therealong so that when the lens tube is telescoped within a lens holder with the collar in engagement with its outer end the lens will be located in approximately correct focusing position with respect to the film. Another feature of the invention is the provision of a pin upon the ring adapted to be received within a complementary recess in the end of the lens holder in order to facilitate the assembly of the lens in a definite angular relationship with respect to the holder in a position such that distortion of the projected image due to non-symmetry of the lens is reduced to a minimum. By such an arrangement lens tubes may be repeatedly associated with the holder of a projecting machine always in correct predetermined position without unnecessary loss of time in adjusting it to focus every time it is inserted in the machine.

Another feature of the invention is the provision of an expansible escutcheon ring surrounding an opening in a wall of the projector housing, the construction being such that the ring will yield permitting a lens tube carrying a stop collar upon its circumference to be inserted thru the opening. More particularly the escutcheon ring is composed of a number of segments arranged to be moved in a radial direction to enlarge the opening when the stop carried by the lens tube is passed axially thru the opening but closing under spring tension around the circumference of the tube after the stop has moved beyond to form a seal against the passage of light from the interior of the housing. This permits quickly switching from one lens tube to another by merely withdrawing one tube lengthwise from its holder and then shoving another tube into place by a purely mechanical operation.

While the invention is embodied in a form of projecting machine adapted for interchangeable use with films having their picture squares located either centrally or non-centrally thereon, which projecting machine is being claimed in a copending application filed August 5, 1930 Serial No. 473,174 by Michael Berkowitz, the invention is not limited in its application to any particular form of projector but may be embodied in any of the well-known machines now on the market.

The invention will be better understood from the following detailed description of one exemplification, reference being had to the accompanying drawings in which:

Figure 1 is a perspective of a portion of a projecting machine showing more or less diagrammatically the relative positions occupied by the film, the lens holder and the escutcheon ring assembly;

Figure 2 is a section of the escutcheon ring assembly on the plane 2—2 of Figure 1;

Figure 3 is a section on the plane 3—3 of Fig. 1;

Figure 4 is a section on the plane 4—4 of Figure 2; and

Figure 5 is a fragmentary view of the escutcheon ring showing the abutting ends of two adjacent segments of the ring.

In the partial showing of Fig. 1 which is illustrative of the form of projecting machine described in the above-mentioned copending application, a lens holder 1 is supported in position with its axis substantially perpendicular to a film $a$ and arranged to be shifted transversely of the film by means of a crank 2, conveniently accessible for hand manipulation from the exterior of projector housing 3. The crank is arranged to rock a shaft 4 which is operatively connected to the lens holder 1 by means of an arm 5 pivoted to lug 6 forming an integral part of the holder. By moving the crank 2 backward or forward the lens holder is shifted across the film upon the pins 7 and 8 to bring the center of the lens into coincidence with the geometrical center of a picture square upon the film, thus avoiding distortion in the image projected upon the screen. The lens holder 1, it will also be understood, is movable in a direction perpendicular of the film by the usual means not shown for bringing the lens to sharp focus.

The front of the lens housing 3 is provided with a circular opening 10 thru which extends a lens tube 11 adapted to be fastened within the lens holder 1 by means of a clamp 11$a$. This lens tube is encircled by a split stop collar 12 designed to be slid lengthwise of the tube but normally held in adjusted position by means of a screw 13 which releasably clamps together the ends of the collar 12 so as to maintain the collar in firm frictional engagement with the circumference of the tube. This collar is of rectangular cross section and preferably of spring metal so that when the screw 13 is released the collar expands away from the tube permitting it to be readily slid along and shifted rotatively about the tube. A pin 13a extending laterally from the collar is arranged to seat in a complementary recess 13b formed in the end of lens holder 1.

Surrounding the opening 10 in the projector housing is an escutcheon box 15 composed of a generally cylindrical wall 16, a bottom 17 having an opening 18' formed therein of the same size as the opening 10 with which it is in alignment, and a cover 18. The cover is also provided with a circular opening 19 corresponding in size to the openings 10 and 18', this cover being held in assembly with one end of the box by screws 20. The box 15, while of generally cylindrical shape, has its wall 16 offset upon diametrically opposite sides to define, in conjunction with the bottom 17 and cover 18, a pair of recesses 21 and 22 within which are received ears 24 and 25 projecting radially from an escutcheon plate 27 of generally circular shape. Sufficient clearance is provided between the outer circumference of the plate 27 and the inner circumference of the box 15 to allow shifting of the plate for following the transverse movements of lens tube 11 when the crank 2 is rocked. The ears 24 and 25 lie in contact with flat bearing surfaces 28 and 29 of bottom 17 in order to insure the rectilinear travel of the plate. This floating arrangement of the escutcheon plate is more particularly described and claimed in the copending application referred to above and forms no essential part of the present invention.

Interposed between the plate 27 and the cover 18 is an escutcheon ring 30 composed of a plurality of identical segments 31. These segments, as shown in Figure 2, are formed by two converging walls 33 and 33a defining at their line of intersection an arc constituting a portion of the inner circumference of the ring. The walls 33 and 33a merge respectively with parallel walls 33b and 33c which are located such a distance apart as to snugly fit within the space between the plate 27 and cover 18. As will be seen from Figure 5, the ends of each of the segments are complementary formed to interfit with their adjacent segments along two angularly displaced axial planes of contact 31a and 31b and a single radial plane of contact 31c. Each of the segments 31 are provided with a pair of guide pins 35 which project into radial slots 36 formed in the plate 27 so that the segments will be constrained to move in radial directions when the ring is expanded. A number of spiral springs 34, having their terminals connected to cross pins 35a, formed by continuations of certain of the pins 35 between the walls 33b and 33c of the segments, exert sufficient lateral pressure against each of the segments to resiliently hold them in contracted assembly.

The operation of the embodiment just described is as follows: A film a is intermittently moved downwardly in the usual manner intermediate a source of light and a projecting lens, being intermittently exposed to a beam of light which passes thru the film and lens and casts an image upon a screen. When one lens in a projecting machine is to be replaced by another, as for example is the case when the size of the image projected upon the screen is to be varied, the clamp 11a in the lens holder 1 is released and the protruding end of lens tube 11 is grasped by the operator and pulled axially outward. This brings the stop collar 12 in contact with the sloping walls 33a of the segments of the escutcheon ring 30 and thru the wedging action of the collar 12 the segments are cammed apart against the action of springs 34 to allow the collar to pass.

The new lens tube which is to be substituted for the tube just withdrawn is also provided with a collar 12 which has previously been appropriately adjusted along the tube in accordance with the characteristics of the lens. This adjustment should be such as not only to locate the lens at the proper focal distance perpendicularly of the film, but also in correct angular position about the axis of the lens, using the recess 13b in the lens holder 1 as a point of reference, so as to reduce as far as possible any distortion of the image which may be produced by an imperfectly ground lens when the lens is assembled with the holder. When the proper position of the lens has once been ascertained by the operator the collar 12 is clamped upon the tube, by means of the screw 13. The tube is now telescoped within the lens holder 1 which action causes the collar 12 to engage the sloping walls 33 of segments 31 to expand the ring and permit the collar to pass thru the ring 30 until it abuts against the lens holder 1 and the pin 13a enters the recess 13b. After the collar 12 has passed thru the ring 30 the segments reseat themselves about the circumference of the lens tube in slightly expanded relation and effect a seal against the passage of light which might otherwise escape from the housing thru the oversize opening 10. Owing to the overlap between the adjacent ends of the individual segments resulting from the fact that the areas of contact of walls 33, 33a, 33b and 33c lie within two different planes displaced a slight distance circumferentially about the ring, appreciable expansion of the ring may occur without allowing light to escape from the interior of the housing 1 between the spread apart ends of the segments.

I claim:

1. In a motion picture projecting machine, a housing having an opening therein, a lens holder contained within the housing, a lens tube carried by the holder and projecting thru the opening in the housing, and a resilient light impervious annulus surrounding the opening and in contact with the tube and sealing the space between said opening and said tube.

2. In a motion picture projecting machine, a housing having an opening therein, a lens holder contained within the housing, a lens tube carried by the holder and projecting thru the opening in the housing, an expansible light impervious annulus carried by the housing and in yielding contact with the tube for sealing the opening against the passage of light around said tube.

3. In a motion picture projecting machine, a housing having an opening therein, a lens holder contained within the housing, a lens tube carried by the holder and projecting thru the opening in the housing, and an expansible ring surrounding the opening and in contact with the tube, said ring being composed of a plurality of segmental portions capable of radial movement and being circumferentially complete in the whole space between said opening and said tube.

4. In a motion picture projecting machine, a housing having an opening therein, a lens holder contained within the housing, a lens tube carried by the holder and projecting thru the opening in the housing, a casing surrounding the opening, and an expansible ring loosely contained within the casing, said ring extending completely across the space between said opening and said tube and being composed of a plurality of segments mounted for independent radial movement, and means for resiliently holding the segments in contact with the lens tube.

5. In a motion picture projecting machine, a housing having an opening therein, a lens holder contained within the housing, a lens tube carried by the holder and projecting thru the opening in the housing, a casing surrounding the opening, a plate contained in the casing, said plate having an aperture larger than the lens tube, a plurality of segments arranged in the form of a ring contained within the casing, an elastic member encircling the segments to resiliently hold them in assembly but permitting of outward radial movement, and interengaging means carried by the plate and segments for guiding the segments in radial directions.

6. In a motion picture projecting machine, a housing having an opening therein, a lens holder contained within the housing, a lens tube carried by the holder and projecting thru the opening in the housing, a stop carried upon the circumference of the tube, and an expansible ring surrounding the opening and in contact with the circumference of the tube, said ring having a sloping wall adapted to cooperate with the stop upon the tube for expanding the ring.

7. In a motion picture projecting machine, a housing having an opening therein, a lens holder contained within the housing, a lens tube carried by the holder and projecting thru the opening in the housing, a stop carried upon the circumference of the tube, and an expansible ring surrounding the opening and in contact with the circumference of the tube, said ring being composed of a plurality of segments each having a sloping wall adapted to cooperate with the stop upon the tube to radially expand the ring.

8. In a motion picture projecting machine, a housing having an opening therein, a lens holder contained within the housing, a lens tube carried by the holder and projecting thru the opening in the housing, a stop carried upon the circumference of the tube, and an expansible ring surrounding the opening and in contact with the circumference of the tube, said ring having sloping wall portions converging toward its internal circumference and adapted to cooperate with the stop upon the tube for expanding the ring.

9. In a motion picture projecting machine, a housing having an opening therein, a lens holder contained within the housing, a lens tube carried by the holder and projecting thru the opening in the housing, a stop carried upon the circumference of the tube, and an expansible ring surrounding the opening and in contact with the circumference of the tube, said ring being composed of a plurality of segments each having sloping front and rear wall portions converging toward its internal circumference and adapted to cooperate with the stop upon the tube for moving the segments radially outward.

10. In a motion picture projecting machine, a housing having an opening therein, a lens holder contained within the housing, a lens tube carried by the holder and projecting thru the opening in the housing, a stop carried upon the circumference of the tube, a casing surrounding the opening in the housing, a plate contained in the casing, said plate having an aperture larger than the lens tube, an expansible ring loosely contained within the casing, said ring being composed of a plurality of segments each having sloping front and rear walls converging toward its internal circumference, resilient means for retaining the segments in assembly but permitting of outward radial movement, and means upon the plate for guiding the segments in radial directions.

11. In a motion picture projecting machine, a housing having an opening therein, a lens holder contained within the housing, a lens tube carried by the holder and projecting thru the opening in the housing, and an expansible ring surrounding the opening and in yielding contact with the tube for sealing the opening against the passage of light, said ring comprising a plurality of segments arranged for radial movement, said segments having their ends provided with overlapping portions to prevent the passage of light when the ring is expanded.

MICHAEL BERKOWITZ.